United States Patent Office 3,503,979
Patented Mar. 31, 1970

3,503,979
HETEROCYCLIC N,N'-DIGLYCIDYL COMPOUNDS
Juergen Habermeier, Allschwil, and Daniel Porret, Binningen, Switzerland, assignors to Ciba Limited, Basel, Switzerland, a company of Switzerland
No Drawing. Filed Jan. 14, 1969, Ser. No. 791,146
Claims priority, application Switzerland, Jan. 17, 1968, 676/68
Int. Cl. C07d 51/30, 51/28
U.S. Cl. 260—260                                            6 Claims

ABSTRACT OF THE DISCLOSURE

New heterocyclic N,N'-diglycidyl compounds of formula

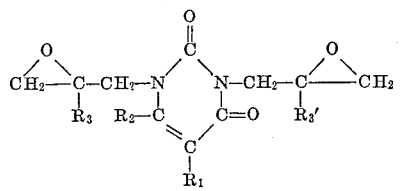

wherein $R_1$ and $R_2$ independently of each other denotes a hydrogen atom or an aliphatic, cycloaliphatic, araliphatic or aromatic hydrocarbon residue such as especially a lower alkyl residue having 1 to 4 carbon atoms and $R_3$ as well as $R_3'$ each denotes a hydrogen atom or the methyl group are resin precursors.

---

The subject of the present invention is new heterocyclic N,N'-diglycidyl compounds of formula

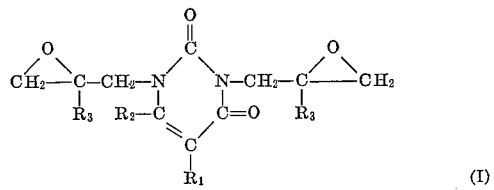

wherein $R_1$ and $R_2$ independently of each other denotes a hydrogen atom or an aliphatic, cycloaliphatic, araliphatic or aromatic hydrocarbon residue, such as especially a lower alkyl residue having 1 to 4 carbon atoms and $R_3$ and $R_3'$ each denotes a hydrogen atom or the methyl group.

In the above formula, one of the two residues $R_1$ and $R_2$ preferably denotes a hydrogen atom and the other a methyl group.

The new diepoxides are manufactured according to methods which are in themselves known. The preferred procedure is to convert into epoxyethyl residues the residues X in a compound of formula

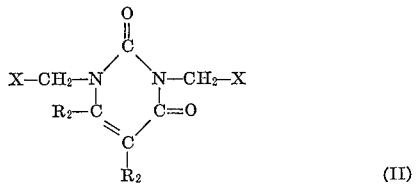

wherein $R_1$ and $R_2$ have the abovementioned significance and the residues X are residues capable of conversion to 1,2-epoxyethyl residues.

A residue X which is capable of conversion to the 1,2-epoxyethyl residue is above all a hydroxyhalogenethyl residue which carries the functional groups on different carbon atoms, especially a 2-halogeno-1-hydroxyethyl residue or a 2-halogeno-1-hydroxy-1-methylethyl residue.

Herein halogen atoms are especially chlorine or bromine atoms. The reaction takes place in the usual manner, above all in the presence of reagents which split off hydrogen halide such as strong alkalis, for example anhydrous sodium hydroxide or aqueous sodium hydroxide solution. It is at the same time however also possible to use other strong alkaline reagents such as potassium hydroxide, barium hydroxide, calcium hydroxide, sodium carbonate or potassium carbonate.

A further residue X which can be converted to the 1,2-epoxyethyl residue is for example the ethenyl residue which can be converted to the 1,2-epoxyethyl residue in a known manner such as above all by reaction with hydrogen peroxide or per-acids, for example peracetic, perbenzoic or monoperphthalic acid.

The starting substance of Formula II are obtained in a manner which is in itself known. Thus it is for example possible to react a uracil of formula

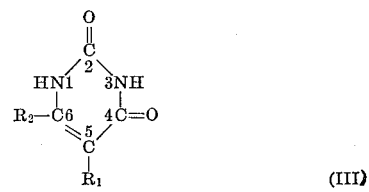

wherein $R_1$ and $R_2$ have the abovementioned significance with a compound of formula X—$CH_2$—Hal, wherein Hal represents a halogen atom and X has the abovementioned significance. Preferably, the compound of Formula III is reacted with an epihalogenohydrin or β-methyl-epihalogen hydrin, above all epichlorhydrin or β-methyl-epichlorhydrin in the presence of a catalyst such as especially a tertiary amine, a quaternary ammonium base or a quaternary ammonium salt. Suitable catalysts for the addition of epichlorhydrin or β-methyl-epichlorhydrin are above all tertiary amines such as triethylamine, tri-n-propylamine, benzyldimethylamine, N,N'-dimethylaniline and triethanolamine; quaternary ammonium bases such as benzyltrimethylammonium hydroxide; quaternary ammonium salts such as tetramethylammonium chloride, tetraethylammonium chloride, benzyltrimethylammonium chloride, benzyltrimethylammonium acetate or methyltriethylammonium chloride; hydrazines having a tertiary nitrogen atom such as 1,1-dimethylhydrazine, which can also be employed in a quaternised form; alkali halides such as lithium chloride, potassium chloride, sodium chloride, bromide or fluoride; furthermore, ion exchange resins having tertiary or quaternary amino groups as well as ion exchangers having acid amide groups.

Basic impurities which can occur in technical commercial forms of the starting compounds (III) can also serve as the catalyst. In such cases it is not necessary to add a special catalyst.

The invention also relates to those embodiments of the process in which one starts from a compound obtained as an intermediate at any stage of the process and carries out the missing stages or in which a starting substance is formed under the reaction conditions and further processed without isolation.

A preferred embodiment of the process therefore for example consists of reacting an epihalogenohydrin or β-methylepihalogenohydrin, preferably epichlorhydrin or β- methylepichlorhydrin, in the presence of a catalyst such as preferably a tertiary amine, a quaternary ammonium base or a quaternary ammonium salt, with a compound of Formula III and in a second stage treating the resulting product containing halogenohydrin groups with reagents which split off hydrogen halide. In these reactions the procedure described above is followed, and the abovementioned compounds can be used as catalysts for the addition of epichlorhydrin or β-methylepichlorhydrin or for the dehydrohalogenation. At the same time particularly good yields are obtained if an excess of epichlorhydrin or β-methylepichlorhydrin is used. A partial epoxidation of the dichlorhydrin or the dichloro-β-methylhydrin of the uracil already takes place during the first reaction, before the addition of alkali. The epichlorhydrin or the β-methylepichlorhydrin, which act as hydrogen chloride acceptors, are then partially converted to glycerine dichlorhydrin or B-methylglycerine dichlorhydrin.

The manufacture of the N,N'-diglycidyl compounds according to the process described above succeeds particularly easily when starting from uracils of formula

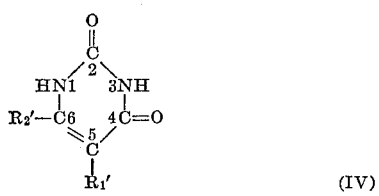

(IV)

wherein $R_1'$ and $R_2'$ both denote hydrogen or one of the two residues denotes a hydrogen atom and the other residue a methyl group.

Uracils of Formula IV are uracil itself, and also 6-methyl-uracil and thymin (=5-methyl-uracil). The 5- or 6-methyl-uracils are particularly easily capable of conversion to the glycidyl compound. The addition of the epihalogenohydrin or of the β-methylepihalogenohydrin to the methyl-uracils can take place according to known processes, with or without solvents, with a lesser or greater excess of epihalogenohydrin or β-methylepihalogenohydrin, at temperatures of up to 140° C., under the catalytic action of tertiary amines, quaternary ammonium salts, alkali halides and other anionically active catalysts in 30 to 360 minutes. The subsequent dehydrohalogenation can take place at 40–70° C. with solid or liquid alkalis and optionally with the resulting water being distilled off azeotropically. The alkali halide is separated off according to known processes.

The resulting 1,3-diglycidyl or 1,3-di-(β-methylglycidyl)-uracils are isolated by distilling off the excess epihalogenohydrin or β-methylepihalogenohydrin and optionally the solvent. They are obtained as viscous liquids or as a crystal sludge in yields of up to 100%. 1,3-diglycidyl-6-methyl-uracil of formula

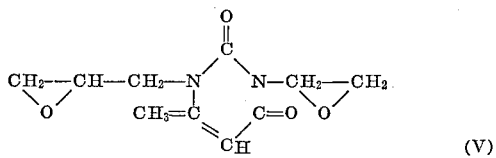

(V)

can for example be obtained in any desired purity by repeated recrystallisation.

The diepoxides according to the invention of Formula I react with the usual curing agents for epoxide compounds. They can therefore be cross-linked or cured by adding such curing agents, in a manner analogous to that used in the case of other polyfunctional epoxide compounds. Basic or acid compounds are possible curing agents of this kind.

The following have proved suitable: amines or amides such as aliphatic and aromatic primary, secondary and tertiary amines, for example m-phenylene diamine, p-phenylene diamine, bis(p-aminophenyl)-methane, ethylene diamine, hexamethylene diamine, trimethylhexamethylene diamine, N,N'-diethylethylene diamine, diethylene triamine, tetra(hydroxyethyl)-diethylene triamine, triethylene tetramine, N,N-dimethylpropylene diamine, bis(4-aminocyclohexyl)-dimethylmethane, 3,5,5-trimethyl - 3 - (aminomethyl) - cyclohexylamine, Mannich bases such as 2,4,6-tris-(dimethylaminomethyl) phenol; dicyandiamide, melamine, cyanuric acid; urea-formaldehyde resins, melamine-formaldehyde resins; polyamides, for example those obtained from aliphatic polyamines and dimerised or trimerised unsaturated fatty acids; polyhydric phenols, for example resorcinol, bis(4-hydroxyphenyl)-dimethylmethane, phenol-formaldehyde resins; reaction products of aluminium alcoholates or phenolates with tautomerically reacting compounds of the type of acetoacetic ester, Friedel-Crafts catalysts, for example $AlCl_3$, $SbCl_4$, $ZnCl_2$, $BF_3$ and their complexes with organic compounds, such as for example $BF_3$-amine complexes; metal fluoroborates such as zinc fluoroborate; phosphoric acid; boroxines such as trimethoxyboroxine; polybasic carboxylic acids and their anhydrides, for example phthalic anhydride, $\Delta^4$-tetrahydrophthalic anhydried, hexahydrophthalic anhydride, 4-methylhexylhydrophthalic anhydride, 3,6-endomethylene-$\Delta^4$-tetrahydrophthalic anhydride, 4-methyl-3,6-endomethylene-$\Delta^4$-tetrahydrophthalic anhydride (=methylnadicanhydride), 3,4,5,6,7,7 - hexachlor - 3,6 - endomethylene - $\Delta^4$ - tetrahydrophthalic anhydride, succinic anhydride, adipic anhydride, maleic anhydride, azelaic anhydride, allylsuccinic anhydride, dodecenylsuccinic anhydride; 7-allyl-bicyclo (2,2,1)-hept-5-ene-2,3-dicarboxylic acid anhydride, pyromellitic acid dianhydride or mixtures of such anhydrides.

When curing with anhydrides it is optionally possible conjointly to use accelerators such as tertiary amines, their salts or quaternary ammonium compounds, for example 2,4,6-tris-(dimethylaminomethyl)-phenol, benzyldimethylamine or benzyldimethylammonium phenolate, $tin^{II}$ salts of carboxylic acids such as $tin^{II}$ octoate or alkali metal acoholates such as for example sodium hexylate.

When curing the polyepoxides according to the invention with anhydrides it is appropriate to use 0.5 to 1.1 gram equivalents of anhydride groups per 1 gram equivalent of epoxide groups.

The expression "cure" as used here denotes the conversion of the above diepoxides into insoluble and infusible cross-linked products, as a rule with simultaneous shaping to give shaped articles such as castings, pressings or laminates or to give two-dimensional structures such as coatings, lacquers or glue bonds.

If desired, active diluents such as for example butylglycid, cresylglycid or 3-vinyl-2,4-dioxaspiro(5,5)-9,10-epoxy-undecane may be added to the diepoxides according to the invention in order to lower the viscosity.

The diepoxides according to the invention can furthermore be used mixed with other curable diepoxide or polyepoxide compounds. As such there may for example be mentioned: polyglycidyl ethers of polyhydric alcohols or especially of polyhydric phenols such as resorcinol, bis-(4-hydroxyphenyl)-dimethylmethane (=bisphenol A), bis(4-hydroxyphenyl)-sulphone- or condensation products of formaldehyde with phenols (novolacs); furthermore, di- or poly-(β-methylglycidyl) ethers of the abovementioned polyalcohols and polyphenols; polyglycidyl esters of polycarboxylic acids such as for example phthalic acid diglycidyl ester or hexahydrophthalic acid diglycidyl ester; triglycidyl isocyanurate; aminopolyepoxides such as are obtained by dehydrohalogenation of the reaction products of epihalogenohydrin and primary or secondary amines such as aniline or 4,4'-diaminodiphenylmethane, as well as alicyclic compounds containing several epoxide groups such as epoxyethyl-3,4-epoxycyclohexane (vinylcyclohexene-diepoxide),
dicyclopentadiene-diepoxide,
ethylene glycol-bis-(3,4-epoxytetrahydrodicyclopentadien-8-yl) ether,
(3',4'-epoxycyclohexylmethyl)-3,4-epoxycyclohexanecarboxylate,
(3',4'-epoxy-6'-methylcyclohexylmethyl)-3,4-epoxy-6-methylcyclohexanecarboxylate,
bis(cyclopentyl) ether-diepoxide or 3-(3',4'-epoxycyclohexyl)-2,4-dioxaspiro-(5,5)-9,10-epoxy-undecane.

A subject of the present invention are therefore also curable mixtures which are suitable for the manufacture of shaped articles including two-dimensional structures and which contain the diepoxides according to the invention, optionally together with other diepoxide or polyepoxide compounds and furthermore curing agents for epoxide resins such as polyamines or polycarboxylic acid anhydrides.

The diepoxide compounds according to the invention, or their mixtures with other polyepoxide compounds and/or curing agents can furthermore, before cure, be mixed at any stage with extenders, fillers and reinforcing agents, plasticisers, pigments, dyestuffs, flame-inhibiting substances or mould release agents.

Asphalt, bitumen, glass fibres, boron fibres, carbon fibres, cellulose, mica, quartz powder, hydrated aluminium oxide, gypsum, kaolin, ground dolomite, silica aerogel (Aerosil) or metal powders such as aluminium powder can for example be used as extenders, fillers and reinforcing agents.

The curable mixtures can, in the unfilled or filled state, optionally in the form of solutions or emulsions, serve as laminating resins, paints, lacquers, dipping resins, impregnating resins, casting resins, compression-moulding compositions, sintering powders, spreading and trowelling compositions, floor covering compositions, embedding and insulating compositions for electrotechnology, or adhesives, as well as for the manufacture of such products.

In particular, the mixtures of 1,3-diglycidyl-6-methyl-uracil with polyamines or polycarboxylic acid anhydrides represent very reactive resin/curing agent systems, wherein the resin component can, because of its crystallinity, not only be used as a casting resin, electrical resin or laminating resin but especially also in compression-moulding compositions and fluidised bed coating powders.

Cured shaped articles made from this resin show good heat stability and good electrical properties coupled with good mechanical properties.

In the examples which follow the parts denote parts by weight and the percentages denote percentages by weight.

(I) EXAMPLES OF MANUFACTURE

Example 1

A mixture of 378.5 g. of 6-methyl-uracil (3.0 mols), 8325.0 g. of epichlorhydrin (90 mols) [corresponding to a 15 molar excess per 1 NH group] and 2.48 g. of tetraethylammonium chloride (0.5 mol percent) is heated to 90° C. whilst stirring and passing in a slight stream of nitrogen. The mixture is stirred for 180 minutes at this temperature. The entire 6-methyluracil gradually dissolves, after 130 minutes the solution is pale yellow and clear. The mixture is cooled to 60° C. and 434.0 g. of finely powdered solid sodium hydroxide (10.8 mols) are added in small portions, with vigorous stirring, over the course of 30 minutes, in the course of which the temperature is kept at 60° C. After addition of alkali the mixture is stirred for a further 20 minutes at 60° C.

The mixture is then distilled at 60° C. and under about 40 mm. Hg with good stirring until all water produced in the reaction has been azeotropically distilled off. The resulting salt is now separated from the solution by filtration and washed with a little epichlorhydrin. The combined epichlorhydrin solutions are then concentrated at 60° C. in a water-jet vacuum until no further epichlorhydrin distills off. Thereafter the residue is further treated at 0.2 mm. Hg until the last traces of volatile constituents have been removed.

An ochre-coloured crystal sludge is obtained in 92% yield (657.0 g.). The crude product contains 7.95 epoxide equivalents/kg. (=94.6% of theory) and 1.4% of chlorine. The product thus largely consists of 1.3-diglycidyl-6-methyl-uracil.

In order to purify it, the product can be recrystallised from methanol and after a single recrystallisation pale yellow to colourless crystals having a melting point of 107–107.5° C. are obtained. The epoxide content is 8.36 epoxide equivalents/kg. (99.7% of theory). Elementary analysis shows:

Calc'd (percent): C, 55.49; H, 5.92; N, 11.76; Cl, 0. Found (percent): C, 55.21; H, 5.90; N, 11.67; Cl, less than 0.3.

The new substance is not only soluble in many organic solvents (methanol, ethanol, acetone, methylene chloride, chloroform and epichlorhydrin) but also in water to the extent of about 48 g./l. The infra-red spectrum indicates the purity of the 1,3-diglycidyl-6-methyl-uracil by the absence of NH frequencies and the presence of epoxide frequencies. The ultra-violet spectrum (in CHCl₃) indicates, by its sole absorption maximum at 265 nm., that the structure

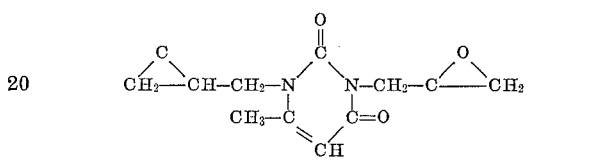

is present. One is thus dealing with the di-(N-glycidyl) product and no O-glycidylation is present.

Example 2

50.4 g. of 6-methyluracil (0.4 mol), 1480.0 g. of epichlorhydrin (16 mols; 20-fold molar excess per 1 NH group) and 0.66 g. of tetraethylammonium chloride (1 mol percent) are boiled for 120 minutes under reflux at 116–119° C. with good stirring; a reddish-brown solution is thereby produced.

The reaction mixture is then cooled to 60° C. and 35.2 g. of finely powdered solid sodium hydroxide in 4 portions are added over the course of 35 minutes with intensive stirring. In order to complete the dehydrohalogenation the mixture is further stirred for 1 hour at 60° C. Further working-up takes place as decribed in Exaple 1.

A brownish-red viscous resin having an epoxide content of 7.65 epoxide equivalents/kg. (91.2% of theory) is produced in 97.7% yield (92.2 g.). On adding a little methanol the product immediately crystallises. The yellow crystals have an epoxide content of 8.29 epoxide equivalents/kg. (98.6% of theory) and a chlorine content of 0.5%.

Example 3

A mixture of 61.06 g. of 6-methyluracil, 925.0 g. of epichlorhydrin (approximately 10-fold molar excess per 1 NH group) and 0.21 g. of lithium chloride (1 mol percent) is stirred for 300 minutes at 115–118° C.

After 120 minutes a further 0.21 g. of lithium chloride (1 mol percent) is added. A reddish-brown solution is produced which is cooled to 60° C. after the time mentioned. 48.0 g. of sodium hydroxide powder are added in small portions over the course of 30 minutes. The water produced in the reaction is removed as described in Example 1. The resulting salt is removed by washing out with water and the epichlorhydrin solution is dried with sodium sulphate. The resin is isolated as described in Example 1. 96 g. of an orange-coloured viscous liquid (83% of theory) having an epoxide content of 7.1 epoxide equivalents/kg. (84% of theory) are obtained.

Example 4

63.0 g. of 6-methyluracil (0.5 mol), 1850.0 g. of epichlorhydrin (20 mols, corresponding to a 20-fold excess relative to NH) and 0.83 g. of tetraethylammonium chloride (1 mol percent) are mixed and stirred for 180 minutes under reflux at 115–117° C. Thereafter the mixture is cooled to 60° C. and a solution of 52.0 g. of sodium hydroxide in 50 ml. of water is slowly added dropwise, with the water present in the reaction medium simultaneously being removed by circulatory distillation. After working-up in accordance with Example 1, 125.0 g. of a dark brown viscous and partially crystallised resin having an epoxide content of 6.90 epoxide equivalents/ kg. (82.0 percent of theory) are obtained. After recrystallisation from ethanol pale yellow crystals are produced having an epoxide content of 8.2 epoxide equivalents/kg. (97.8% of theory) and a chlorine content of 0.3%.

Example 5

81.5 g. of uracil (2,4-dihydroxypyridine) [0.728 mol] and 2020 g. of epichlorhydrin (corresponding to a 15-fold excess per NH group) together with 0.60 g. of tetraethylammonium chloride (0.5 mol percent) are heated to 90° C. for 180 minutes whilst stirring. After 150 minutes all the uracil has dissolved and the reaction medium becomes orange in colour. After cooling to 60° C. 104.7 g. of finely powdered solid sodium hydroxide are added over the course of 30 minutes in 10 portions with good stirring. The mixture is then stirred for a further 15 minutes at 60° C. and worked-up as described in Example 1.

145.5 g. of a reddish resin (89.5% yield) are produced, having an epoxide content of 8.23 epoxide equivalents per kg. (92.3% of theory).

Example 6

A mixture of 31.5 g. of thymin (5-methyluracil) (0.25 mol), 925 g. of epichlorhydrin (10 mols) [corresponding to a 20-fold excess per NH group] and 0.414 g. of tetraethylammonium chloride (0.5 mol) percent is stirred for 3 hours at 90° C. A clear colourless solution is produced. This is cooled to 60° C. and 34.0 g. of finely powdered solid sodium hydroxide are added in small portions at this temperature, with vigorous stirring. The mixture is then stirred for a further 20 minutes at 60° C. and worked-up as described in Example 1.

A clear pale yellow resin, which crystallises on slow cooling, is produced in 91.6% yield (54.5 g.). The epoxide content of the crude product is 7.90 epoxide equivalents/kg. (corresponding to 94.2% of theory).

A single recrystallisation from methanol yields colourless small crystals which melt at 94–95° C. The epoxide content is 8.25 epoxide equivalents/kg. (corresponding to 98.4% of theory). The 1,3-diglycidyl-5-methyluracil is easily soluble in methanol, ethanol, tetrahydrofuran, acetone, benzene, methylene chloride and chloroform; furthermore the product dissolves in water to the extent of about 57.5 g./l. at 20° C.

The infrared spectrum shows the purity of the compound by the absence of the NH frequencies and the presence of epoxide frequencies. The ultra-violet spectrum (in $CHCl_3$) shows, by its sole absorption maximum at 270 nm., that pure N,N'-diglycidylation occurs (compare example 1).

Elementary analysis shows the following values:
Calc'd (percent): C, 55.49; H, 5.92; N, 11.76. Found (percent): C, 55.16; H, 5.86; N, 11.68.

Example 7

A mixture of 25.2 g. of 6-methyluracil (0.2 mol), 3.15 g. of tetraethylammonium chloride (7.5 mol percent) and 853.0 g. of β-methylepichlorhydrin (8 mols) is well stirred for 45 minutes at 120–123° C. After this time the reaction mixture is a yellow clear solution. It is cooled to 58° C. and 43.5 g. of 50% strength aqueous sodium hydroxide solution are added dropwise over the course of 1.5 hours at 55–60° C., with continuous elimination of the water produced in the reaction mixture by azeotropic circulatory distillation. The mixture is cooled to room temperature, filtered to remove sodium chloride, and extracted by shaking with 80 ml of water. After separating off the water layer the organic phase is concentrated at 60° C. in a water-jet vacuum and then subjected to a vacuum of 0.1 mm. Hg at 60° C. in order to remove the last volatile constituents.

51.0 g. of an ochre-coloured resin (95.8% of theory) are obtained. The epoxide content is 6.28 equivalents/kg. (84% of theory). The resin is a highly viscous liquid.

(II) EXAMPLES OF USE

Example A

A mixture of 25.2 g. of 6-methyluracil (0.2 mol), 3.15 methyluracil having an epoxide content of 8.36 epoxide equivalents/kg. (manufactured according to Example 1) and 61 parts by weight of an anhydride curing agent mixture which is liquid at room temperature, containing 9 parts of phthalic anhydride, 13 parts of tetrahydrophthalic anhydride, 78 parts of hexahydrophthalic anhydride and 15 parts of cresylglycid, is warmed to 75° C. whilst stirring, whereupon an orange-red clear solution is produced. The mixture is then cast into aluminium moulds and cured for 4 hours at 120° C. and subsequently for 10 hours at 150° C.

For comparison purposes, a known casting resin mixture is manufactured, with the 40 parts of 1,3-diglycidyl-6-methyluracil in the above example being replaced by 61 parts of a Bisphenol-A epoxide resin which is liquid at room temperature and has an epoxide content of 5.3–5.5 epoxide equivalents/kg. (manufactured by reacting epichlorhydrin in a molar excess with 2,2-bis(p-hydroxyphenyl)propane in the presence of alkali).

The table which follows compares the electrical and mechanical properties of the cured castings.

| Property | Standard specification | 1,3-diglycidyl-6-methyluracil | Bisphenol-A epoxide resin |
| --- | --- | --- | --- |
| Breakdown voltage after 1 minute (kV./cm.) | VDE 0303 | 226 | 200–220 |
| Specific resistance (Ω×cm.) at 90° C | VDE 0303 | $1 \times 10^{16}$ | $7-8 \times 10^{15}$ |
| Arc resistance (level) | VDE 0303 | L4 | L4 |
| Dielectric constant (ε) at 90° C | DIN 53483 | 3.50 | 3.3–3.5 |
| Dielectric loss factor (tg δ) at 120° C. (50 cycles/s) | DIN 53483 | 0.027 | 0.095 |
| Flexural strength, kg./mm.² | VSM 77103 | 10.5 | 13–15 |
| Heat distortion point according to Martens (° C.) | DIN 53458 | 121 | 78–85 |

The castings manufactured from the epoxide resin according to the invention possess better electrical properties and a significantly higher dimensional heat resistance.

Example B

A casting resin mixture is prepared from 122.2 parts of 1,3-diglycidyl-6-methyluracil having an epoxide content of 8.36 epoxide equivalents/kg. and 131.0 parts of tetrahydrophthalic anhydride in accordance with Example A and is processed into castings as in Example A. The cured samples have the following properties:

Heat distortion point according to Martens (DIN)
_____ °/C. __ 161
Flexural strength (VSM 77,103) ____kg./mm.²__ 12.7
Flexural impact strength (VSM 77,105)
                        kg.cm./cm.² __ 9.8
Deflection at break _____mm. __ 7.4
Dielectric loss factor tg δ at 140° C. (50 cycles/s)__ 0.014
Tracking resistance (VDE 0303) _____ level KA 3c
Arcing resistance (VDE 0303) _____ level L4
Specific resistance at 20° C. _____ (Ω×cm.)__ $7.10^{16}$
Breakdown voltage (momentary) ___(kV./cm.)__ 202

Example C

A compression moulding composition is manufactured from 123 parts of 1,3-diglycidyl-6-methyluracil having an epoxide content of 8.36 epoxide equivalents/kg. (manufactured according to Example 1), 152 parts of tetrahydrophthalic anhydride, 10 parts of calcium stearate and 713 parts of burnt kaolin by mixing in a hammer mill.

The compression moulding composition thus obtained is uniformly compression-moulded at 150° C. to give test specimen, with the following compression-moulding conditions being used:

| | kg./cm.² | Minutes at 150° C |
|---|---|---|
| Test rods according to Martens (DIN 53,458) | 500 | 8 |
| Rods for measuring the flexural strength (DIN 53,452) | 500 | 4 |
| Rods for measuring the impact strength or notched impact strength (DIN 53,453) | 500 | 4 |

The following properties of the test specimen were measured:

Flexural strength (DIN 53,452) _____ kp./cm.² __ 156.7
Impact strength (DIN 53,453) ____ cm.Kp./cm.² __ 1.31
Notched impact strength (DIN 53,453) cm.kp./cm.² __ 1.74
Heat distortion point according to Martens (Din 53,458) _____ °/C. __ 94

We claim:
1. A heterocyclic N,N'-diglycidyl compound of formula

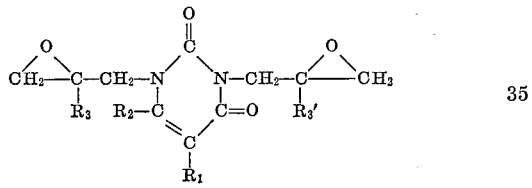

wherein $R_1$ and $R_2$ each are members selected from the group consisting of hydrogen atom and lower alkyl with 1 to 4 carbon atoms, and $R_3$ and $R_3'$ each are members selected from the group consisting of hydrogen atom and the methyl group.

2. A heterocyclic N,N'-diglycidyl compound of formula

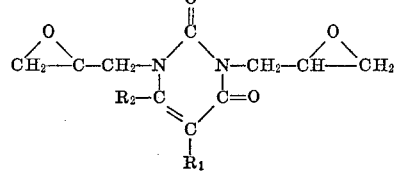

wherein $R_1$ and $R_2$ each are members selected from the group consisting of hydrogen atom and lower alkyl with 1 to 4 carbon atoms.

3. 1,3-diglycidyluracil.
4. 1,3-diglycidyl-6-methyluracil.
5. 1,3-diglycidyl-5-methyluracil.
6. 1,3-di-(β-methylglycidyl)-6-methyluracil.

References Cited

UNITED STATES PATENTS 3,360,523  12/1967  Loux _____ 260—260

ALEX MAZEL, Primary Examiner
A. M. TIGHE, Assistant Examiner

U.S. Cl. X.R.

260—2, 37, 57, 69, 72, 78